United States Patent [19]

Paik et al.

[11] Patent Number: 4,752,953

[45] Date of Patent: * Jun. 21, 1988

[54] DIGITAL AUDIO SCRAMBLING SYSTEM WITH PULSE AMPLITUDE MODULATION

[75] Inventors: Woo H. Paik; Jerrold A. Heller, both of San Diego, Calif.; Gordon K. Walker, Boxborough, Mass.

[73] Assignees: M/A-COM Government Systems, Inc.; Cable/Home Communication Corp., both of San Diego, Calif.

[*] Notice: The portion of the term of this patent subsequent to Aug. 26, 2003 has been disclaimed.

[21] Appl. No.: 895,150

[22] Filed: Aug. 11, 1986

Related U.S. Application Data

[62] Division of Ser. No. 498,824, May 27, 1983, Pat. No. 4,608,456.

[51] Int. Cl.[4] .............................................. H04L 9/00
[52] U.S. Cl. ......................................... 380/9; 380/28
[58] Field of Search .................... 179/1.5 R, 1.5 S; 358/121, 13; 325/17; 340/347 DD; 380/36, 41, 9, 28

[56] References Cited

U.S. PATENT DOCUMENTS

| | | | |
|---|---|---|---|
| 3,911,395 | 10/1975 | Koike | 375/17 |
| 3,925,611 | 12/1975 | Dennis | 375/17 |
| 4,266,243 | 5/1981 | Shutterly | 358/121 |
| 4,275,411 | 6/1981 | Lippel | 358/13 |
| 4,283,602 | 8/1981 | Adams et al. | 179/1.5 R |
| 4,320,499 | 3/1982 | Muilwijk et al. | 375/17 |
| 4,346,473 | 8/1982 | Davis | 375/17 |
| 4,347,619 | 8/1982 | Dakin et al. | 375/17 |
| 4,523,323 | 6/1985 | Nakajima et al. | 375/17 |
| 4,608,456 | 8/1986 | Paik et al. | 179/1.5 S |

OTHER PUBLICATIONS

Uhlig et al., "Sound-in-Sync mit zwei hochwertigen Tonkanälen". Nachrichtentechnik Elektronik—28, (1978) H3, pp. 99–101.

CCIR, "Transmission of Sound and Picture Signals By Time-Division Multiplex", CCIR Doc. CMTT/187-E, Mar. 3, 1977.

*Primary Examiner*—Salvatore Cangialosi
*Assistant Examiner*—Aaron J. Lewis
*Attorney, Agent, or Firm*—Edward W. Callan

[57] ABSTRACT

In a system for scrambling an audio signal for transmission with a video signal having non-video information intervals, an analog audio signal is converted into a scrambled compressed digital audio signal; individual bits from the scrambled compressed digital audio signal are combined to provide 2-bit digital words; each digital word is converted into an 8-bit digital PAM data signal having a binary value bearing a predetermined relationship to the binary value of the converted 2-bit digital word; the 8-bit digital PAM data signal is converted into a 4-level PAM analog signal; and the PAM analog signals are inserted into the non-video information intervals of the video signal for transmission. A descrambling system descrambles the 4-level PAM analog signals by a complementary scheme.

4 Claims, 5 Drawing Sheets

SIGNAL TO QUANTIZATION NOISE VS. INPUT LEVEL

+20 dbm INPUT

4,752,953

DIGITAL AUDIO SCRAMBLING SYSTEM WITH PULSE AMPLITUDE MODULATION

This is a division of application Ser. No. 498,824 filed May 27, 1983, U.S. Pat. No. 4,608,456.

BACKGROUND OF THE INVENTION

The present invention generally pertains to audio signal processing and is particularly directed to improved audio signal scrambling and digital scrambling systems with pulse amplitude modulation (PAM) of the scrambled digital audio signal for transmission in the non-video information intervals of video signals.

There are several prior art systems for scrambling and descrambling audio signals, including systems wherein an analog audio digital signal is converted to digital signal samples, and the bits of the samples are exclusive-OR'd with the bits of a unique keystream to scramble the signal.

There also are several prior art systems for pulse amplitude modulating of digital audio signals.

SUMMARY OF THE INVENTION

The present invention provides a system for scrambling an audio signal for transmission with a video signal having non-video information intervals, including means for converting an analog audio signal into a scrambled compressed digital audio signal; means for combining individual bits from the scrambled compressed digital audio signal to provide n-bit digital words; means for converting each digital word into a $>$n-bit digital PAM data signal having a binary value bearing a predetermined relationship to the binary value of the converted n-bit digital word; means for converting the $>$n-bit digital PAM data signal into an $2^n$-level PAM analog signal; and means for inserting the PAM analog signals into the non-video information intervals of the video signal for transmission.

The present invention further provides a system for descrambling a scambled audio signal derived by converting an analog audio signal into a digital signal to provide a scrambled compressed digital audio signal, by combining individual bits from the scrambled compressed digital signal to provide n-bit digital words, by converting each digital word into a $>$n-bit digital PAM data signal having a binary value bearing a predetermined relationship to the binary value of the converted n-bit digital word, and by converting the $>$n-bit digital PAM data signal into a $2^n$-level PAM analog signal, wherein the PAM analog signals were inserted into non-video information intervals of a video signal for transmission. The descrambling system includes means for converting the $2^n$-level PAM analog signals into $>$n-bit digital PAM data signals; means for converting each $>$n-bit digital PAM data signal into an n-bit digital word having a value bearing a predetermined relationship to the binary value of the $>$n-bit digital PAM data signal; means for providing a scrambled digital audio signal from the n-bit digital words; and means for converting the scrambled digital audio signal into a descrambled decompressed analog audio signal.

DESCRIPTION OF THE PREFERRED EMBODIMENT

Figure 1:
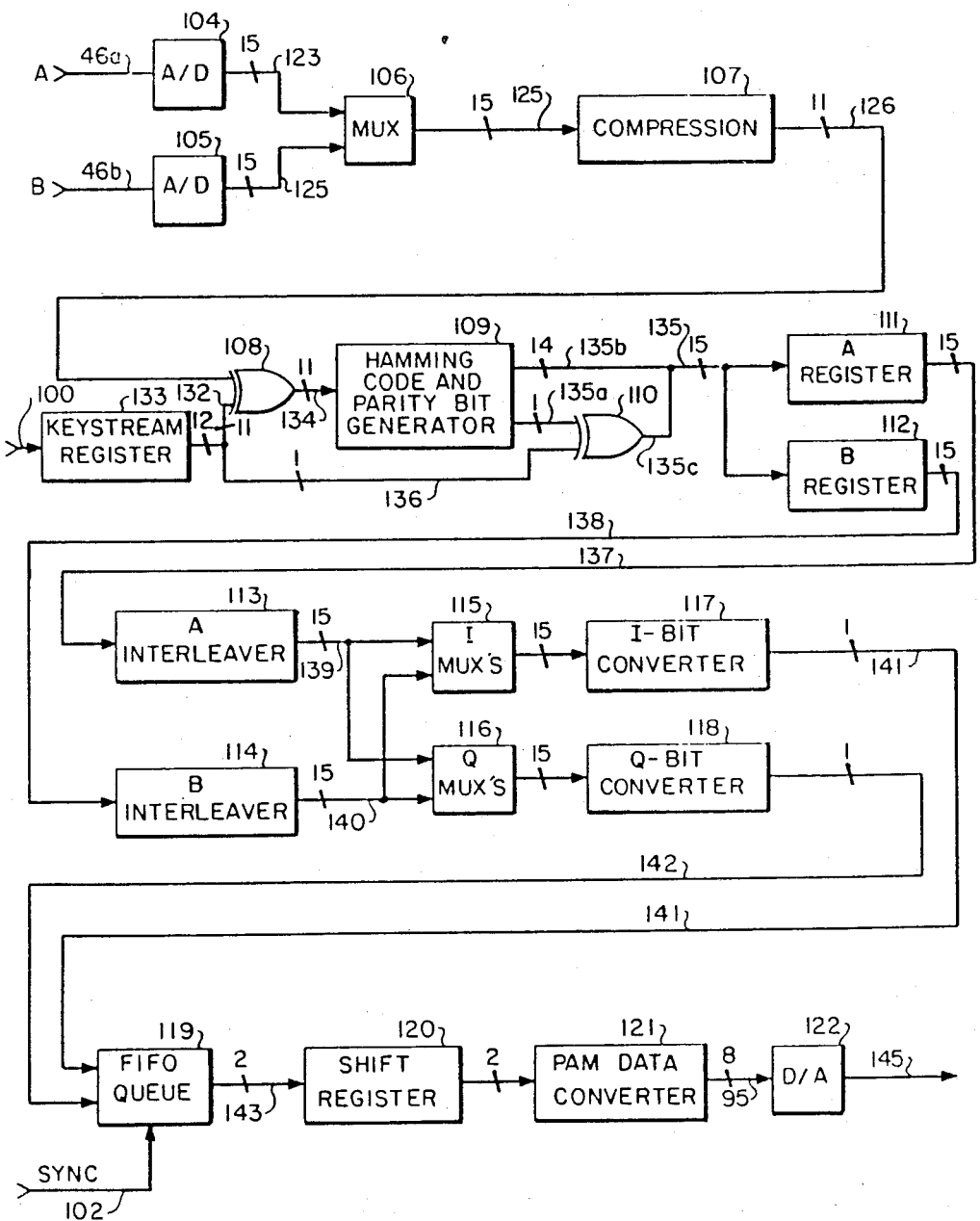
FIG. 1 is a block diagram of the preferred embodiment of the audio scrambling system of the present invention.

The preferred embodiments of the digital audio scrambling and descrambling systems are used in the video scrambling and descrambling systems described in a U.S. Pat. Nos. 4,563,702 and 4,613,901 wherein they are referred to as "audio processors". The same reference numerals are used for like components described both therein and herein. The entire disclosures of both patents are incorporated herein by reference.

Referring to FIG. 1, the preferred embodiment of the digital audio scrambling system includes a first analog-to-digital (A/D) converter 104, a second A/D converter 105, a multiplexer (MUX) 106, a data compression system 107, a first exclusive-OR logic element 108, a Hamming Code and parity bit generator 109, a second exclusive-OR logic element 110, an A-channel register 111, a B-channel register 112, an A-channel interleaver 113, a B-channel interleaver 114, I-bit multiplexers 115, Q-bit multiplexers 116, an I-bit converter 117, a Q-bit converter 118, a FIFO queue 119, a shift register 120, a pulse-amplitude-modulated (PAM) data converter 121 and a digital-to-analog (D/A) converter 122.

The audio scrambling system of FIG. 1 scrambles stereo audio signals received on A channel 46a and B channel 46b. The A/D converters 104, 105 convert analog audio signals on A and B channels 46a, 46b into 15-bit digital signal samples on lines 123 and 124 corresponding to the respective analog audio signals. The A/D converters 104, 105 sample the analog audio signals at a sampling rate of 44.055 kHz, which is the same as the sampling rate for NTSC video tape recorders. There are several reasons for this choice. Coherence with the video signal decreases the overall hardware complexity. This reduces costs and increases reliability. The consumer hardware currently available, VTR adapters and soon to be released Compact Disc digital audio system, are compatible with this rate. A full twenty kHz frequency response is possible with 44.055 kHz which is not the case with 32 kHz.

Another reason to chose 44.055 kHz over 44.1 kHz lies in the video taping process. The 24 Hz cinema frame rate is converted to 30 Hz by repeating one frame in five, and the color frame rate, 29.97 Hz, is then created by slowing down slightly. However, for the video and audio to remain synchronous, the audio must also be slowed. The analogous procedure for audio would be to transcode 48 kHz digital audio to 44.1 kHz (assuming one didn't have 44.1 kHz to start with) and then play back the tape with the audio at a 44.055 kHz rate. This is the case because the ratio of 30/29.97 is exactly equal to 44.1/44.055. Since 48 kHz to 44.1 kHz transcoding will be required for compact disc production, no new hardware will be required for transcoding if 44.055 kHz is the sampling rate. And, finally, a considerable effort is being expended by industry toward cost reductions related to the Compact Disc System. Future satellite systems can utilize this advantage. The digital audio sampling rate clock is generated by dividing a four-times-color-burst (14.318 MHz)-derived clocking signal by 325.

The multiplexer 106 includes fifteen 2-to-1 line multiplexers which operate at the sampling rate of 44.055 kHz to place alternating 15-bit samples from channels A and B onto lines 125.

Figure 2:
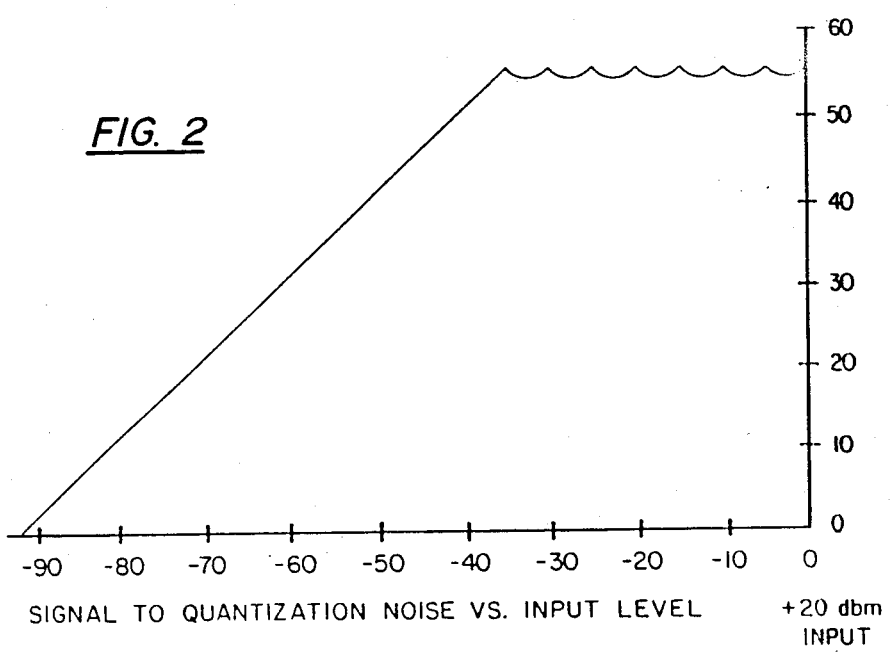
FIG. 2 shows the signal to quantization noise vs. input level characteristic of the compression system in the scrambling system of FIG. 1.

The compression system 107 compresses the fifteen-bit digital signal sample on lines 125 into an eleven-bit signal sample on lines 126 having a sign bit S, three exponent bits E$\emptyset$, E1 and E2 and seven mantissa bits M$\emptyset$, M1, M2, M3, M4, M5 and M6. The signal-to-quantization noise vs. input level characteristic for the compression system 107 is shown in FIG. 2.

Figure 3:
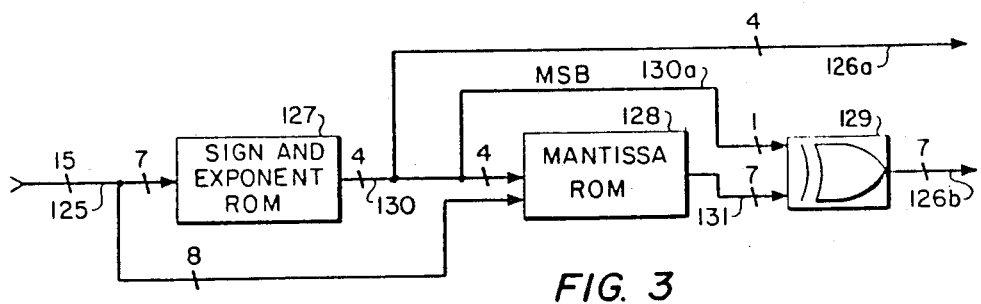
FIG. 3 is a block diagram of the signal-compression portion of the compression system in FIG. 1.

Referring to FIG. 3, the compression system 106 includes a sign and exponent read only memory (ROM) 127, a mantissa ROM 128 and an exclusive-OR logic element 129. The seven most significant bits of the 15-bit digital signal sample on lines 125 are used to address the sign and exponent ROM 127, which in turn provides the sign and exponent bits on lines 130. The seven least significant bits of the 15-bit digital signal on lines 125 and the sign and three exponent bits on lines 130 are combined to address the mantissa ROM 128, which provides the seven mantissa bits on lines 131. The 15 to 11 compression code implemented by the combination of the sign and exponent ROM 127 and the mantissa ROM 128 is set forth in Table 1.

TABLE 1

| 15 to 11 COMPRESSION | | | | | | | | | | | | | | |
|---|---|---|---|---|---|---|---|---|---|---|---|---|---|---|
| INPUT BINARY | | | | | | | | | | | | | | |
| SIGN | EXPONENTS | MANTISSA | | | | OUTPUT BINARY | | | | | | | | |
| 1 | 111 | A B C D E F G | 1 | 1 | A | B | C | D | E | F | G | X | X | X | X | X | X |
| 1 | 110 | A B C D E F G | 1 | 0 | 1 | A | B | C | D | E | F | G | X | X | X | X | X |
| 1 | 101 | A B C D E F G | 1 | 0 | 0 | 1 | A | B | C | D | E | F | G | X | X | X | X |
| 1 | 100 | A B C D E F G | 1 | 0 | 0 | 0 | 1 | A | B | C | D | E | F | G | X | X | X |
| 1 | 011 | A B C D E F G | 1 | 0 | 0 | 0 | 0 | 1 | A | B | C | D | E | F | G | X | X |
| 1 | 010 | A B C D E F G | 1 | 0 | 0 | 0 | 0 | 0 | 1 | A | B | C | D | E | F | G | X |
| 1 | 001 | A B C D E F G | 1 | 0 | 0 | 0 | 0 | 0 | 0 | 1 | A | B | C | D | E | F | G |
| 1 | 000 | A B C D E F G | 1 | 0 | 0 | 0 | 0 | 0 | 0 | 0 | A | B | C | D | E | F | G |
| 0 | 000 | A B C D E F G | 0 | 1 | 1 | 1 | 1 | 1 | 1 | 1 | A | B | C | D | E | F | G |
| 0 | 001 | A B C D E F G | 0 | 1 | 1 | 1 | 1 | 1 | 1 | 0 | A | B | C | D | E | F | G |
| 0 | 010 | A B C D E F G | 0 | 1 | 1 | 1 | 1 | 1 | 0 | A | B | C | D | E | F | G | X |
| 0 | 011 | A B C D E F G | 0 | 1 | 1 | 1 | 1 | 0 | A | B | C | D | E | F | G | X | X |
| 0 | 100 | A B C D E F G | 0 | 1 | 1 | 1 | 0 | A | B | C | D | E | F | G | X | X | X |
| 0 | 101 | A B C D E F G | 0 | 1 | 1 | 0 | A | B | C | D | E | F | G | X | X | X | X |
| 0 | 110 | A B C D E F G | 0 | 1 | 0 | A | B | C | D | E | F | G | X | X | X | X | X |
| 0 | 111 | A B C D E F G | 0 | 0 | A | B | C | D | E | F | G | X | X | X | X | X | X |

The exclusive-OR element logic 129 scrambles the seven mantissa bits on lines 131 by exclusive-OR'ing them with the most significant exponent bit on line 130a. The compressed digital signal sample consisting of the scrambled seven mantissa bits on lines 126b and the sign and three exponent bits on lines 126a are scrambled by the exclusive-OR logic element 108, which exclusive-OR's each compressed digital signal sample on lines 126 with eleven bits of a unique keystream provided on 132 from a keystream register 133 to provide a scrambled compressed signal sample on line 134. Preferably, the keystream provided in accordance with the Data Encryption Standard (DES) algorithm. The unique keystream is provided to the keystream register 133 via line 100 from a keystream generator (not shown).

The Hamming code and parity bit generator 109 generates error detection and correction bits for each compressed signal sample on lines 134 and adds the generated bits thereto to provide error-encoded, compressed signal samples on lines 135. The parity bit is provided on line 135a and the remaining bits are provided on lines 135b.

The exclusive-OR logic element 110 scrambles the parity bit on line 135a with a keystream bit on line 136 from the keystream register 133. The scrambled parity bit is provided on line 135c.

The Hamming code generator portion of generator 109 generates three code bits C$\emptyset$, C1 and C2 for correcting singular errors in a combination of the sign bit S, the exponent bits E$\emptyset$, E1 and E2 and the code bits C$\emptyset$, C1 and C2. Code bit C$\emptyset$ is generated by exclusive-OR'ing the sign bit S, exponent bit E$\emptyset$ and exponent bit E2. Code bit C1 is generated by exclusive-OR'ing the sign bit S, exponent bit E$\emptyset$ and exponent bit E1. Code bit C2 is generated by exclusive-OR'ing exponent bits E$\emptyset$, E1 and E2. The Hamming code for generating the code bits C$\emptyset$, C1 and C2 is shown in Table 2.

TABLE 2

| | | HAMMING CODE | | | | |
|---|---|---|---|---|---|---|
| C2 | C1 | C$\emptyset$ | S | E2 | E1 | E$\emptyset$ |
| 0 | 0 | 0 | 0 | 0 | 0 | 0 |
| 1 | 1 | 1 | 0 | 0 | 0 | 1 |
| 1 | 1 | 0 | 0 | 0 | 1 | 0 |
| 0 | 0 | 1 | 0 | 0 | 1 | 1 |
| 1 | 0 | 1 | 0 | 1 | 0 | 0 |
| 0 | 1 | 0 | 0 | 1 | 0 | 1 |
| 0 | 1 | 1 | 0 | 1 | 1 | 0 |
| 1 | 0 | 0 | 0 | 1 | 1 | 1 |
| 0 | 1 | 1 | 1 | 0 | 0 | 0 |
| 1 | 0 | 0 | 1 | 0 | 0 | 1 |
| 1 | 0 | 1 | 1 | 0 | 1 | 0 |
| 0 | 1 | 0 | 1 | 0 | 1 | 1 |
| 1 | 1 | 0 | 1 | 1 | 0 | 0 |
| 0 | 0 | 1 | 1 | 1 | 0 | 1 |
| 0 | 0 | 0 | 1 | 1 | 1 | 0 |
| 1 | 1 | 1 | 1 | 1 | 1 | 1 |

The parity bit generator portion of the generator 109 generates a parity bit for detecting double errors in a combination of the sign bit S, the three exponent bits and the three code bits and for further detecting an error in the most significant mantissa bit and/or the parity bit. The parity bit P is generated by exclusive-OR'ing the sign S, exponent bit E1, exponent bit E2, mantissa bit M6 and "1".

The error-encoded signal samples derived from the A-channel 46a are buffered in the A-channel register 111 and the error-encoded signal samples derived from the B-channel 46b are buffered in the B-channel register 112.

Figure 4A:
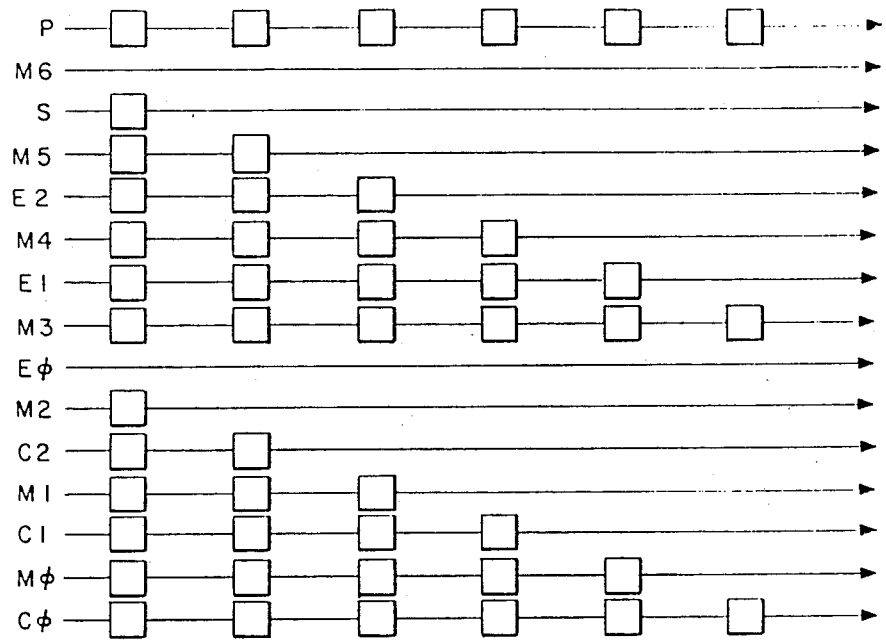
FIG. 4a is a block diagram of the A-channel interleaver in the system of FIG. 1.

The A-channel signal sample is provided on line 137 from the A-channel register 111 to the A-channel interleaver 113, which interleaves bits from a plurality of successive A-channel samples. The construction of the A-channel interleaver 113 is shown in FIG. 4a, wherein each block is a one-sample-period delay element. It is seen from FIG. 4a that bits M6 and E0 are not delayed; bits S and M2 are delayed by one sample period; bits M5 and C2 are delayed by two sample periods; bits E2 and M1 are delayed by three sample periods; bits M4 and C1 are delayed by four sample periods; bits E1 and M0 are delayed by five sample periods; and bits P, M3 and C0 are delayed by six sample periods.

Figure 4B:
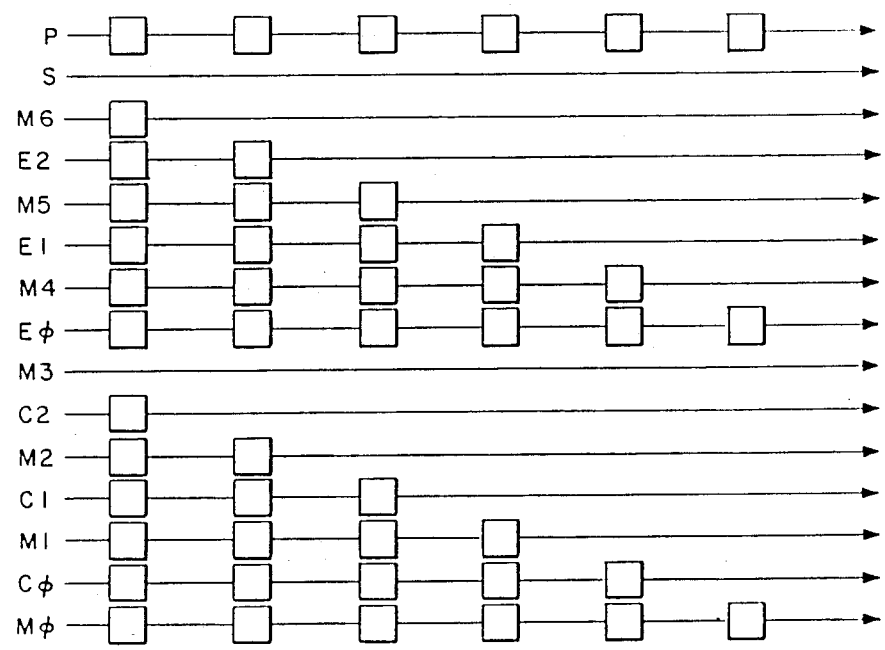
FIG. 4b is a block diagram of the B-channel interleaver in the system of FIG. 1.

The B-channel signal sample is provided on line 138 from the B-channel register 112 to the B-channel interleaver 114, which interleaves bits from a plurality of successive B-channel samples. The construction of the B-channel interleaver 114 is shown in FIG. 4b, wherein each block is a one-sample-period delay element. It is seen from FIG. 4b that bits S and M3 are not delayed; bits M6 and C2 are delayed by one sample period; bits E2 and M2 are delayed by two sample periods; bits M5 and C1 are delayed by three sample periods; bits E1 and M1 are delayed by four sample periods; bits M4 and C0 are delayed by five sample periods; and bits P, E0 and M0 are delayed by six sample periods.

The combination of the I-bit multiplexers 115, the Q-bit multiplexers 116, the I-bit converter 117 and the Q-bit converter 118 cooperate to serialize the interleaved bits on lines 139 and 140 from the A-channel and B-channel interleavers, 113, 114 respectively in order to separate the bits from any single signal sample by at least a predetermined duration associated with a given type of interference signal.

Burst errors typically are caused by FM discriminator clicks. By separating the bits from any single sample by at least the duration of an FM discrimination click, it is possible to spread the error burst so that only one bit in each error encoded signal sample on lines 137 and 138 is affected, whereby single bit errors can be detected and corrected by a Hamming code error corrector in the descrambler. Empirical results indicate that a separation distance of seven sample periods is adequate for error bursts associated with FM discriminator clicks.

Two-bit digital words containing bits I and Q are provided serially on lines 141 and 142 from the I-bit converter 117 and the Q-bit converter 118. The I-bit converter 117 is a 15-bit parallel-to-serial converter for providing the I-bit on line 141. The Q-bit converter 118 is a 15-bit parallel-to-serial converter for providing the Q-bit on line 142. The two-bit digital word on lines 141 and 142 subsequently is processed in such a manner (as described below) that there is a lower error rate in the I-bit position. The I-bit multiplexers 115 and the Q-bit multiplexers 116 combine the interleaved signal samples on lines 139 and 140 to place the sign bit S, the exponent bits E0, E1 and E2, the code bits C0, C1 and C2 from both the A and B channels and the parity bit P from the A-channel in the I-bit position in the digital word by providing these eight to the I-bit converter 117, and to place the mantissa bits M0 through M6 from both the A and B channels and the parity bit P from the B channel in the Q-bit position in the digital word by providing these eight bits to the Q-bit converter 118.

Table 3 shows the serialization in time, the delay accomplished by interleaving, and the placement in the respective I and Q bit positions of the A and B channel signal samples on lines 137 and 138 accomplished by the interleavers 113, 114, the multiplexers 115, 116 and the converters 117, 118.

TABLE 3

| TIME | DELAY | I | Q |
|---|---|---|---|
| 0 | 6 | P-A | P-B |
| 1 | 0 | S-B | M6-A |
| 2 | 1 | S-A | M6-B |
| 3 | 2 | E2-B | M5-A |
| 4 | 3 | E2-A | M5-B |
| 5 | 4 | E1-B | M4-A |
| 6 | 5 | E1-A | M4-B |
| 7 | 6 | E0-B | M3-A |
| 8 | 0 | E0-A | M3-B |
| 9 | 1 | C2-B | M2-A |
| 10 | 2 | C2-A | M2-B |
| 11 | 3 | C1-B | M1-A |
| 12 | 4 | C1-A | M1-B |
| 13 | 5 | C0-B | M0-A |
| 14 | 6 | C0-A | M0-B |

In the preferred embodiment, wherein the scrambled audio signals are the audio portion of a television signal, the digital word signals on lines 141 and 142 are time-compressed by the FIFO queue 119. The FIFO queue 119 time-compresses each interval of the digital-word signals corresponding to the duration of a video signal line into an interval corresponding to the duration of a video signal horizontal sync pulse. Each time-compressed interval of signals is provided on lines 143 from the FIFO queue to the shift register 120 at the video signal line rate during the period normally occupied by the horizontal sync pulse in an NTSC video signal line. During horizontal sync pulse interval, the two-bit words are provided on line 143 at a rate of 7.16 mega-symbols per second. Forty-two bit pairs per horizontal sync pulse interval are sent. This corresponds to 42 bits for each of the two audio channels or 2.8 samples per channel per horizontal sync interval.

The time-compression and timing functions of the FIFO queue 119 are synchronized and clocked in response to synchronization control and timing signals provided on line 102 in response to synchronization control and timing signals generated in response to the detection of the color burst in the video signal. The derivation of the synchronization and timing signals on line 102 is described in more detail in the aforementioned U.S. Pat. No. 4,563,702.

The two-bit digital words in the shift register 120 are converted by the PAM data converter 121 into 8-bit digital PAM data signals on lines 95, which when converted into an analog signal by digital-to-analog conversion provide a pulse-amplitude-modulated signal having a level related to the binary value of the digital words. The level coding is shown in Table 4. Decision thresholds are at 10, 30 and 50 IRE units.

TABLE 4

| TRANSMITTED LEVEL (IRE UNITS) | LEVEL CODING | |
|---|---|---|
| 60 | 1 | 0 |
| 40 | 1 | 1 |

TABLE 4-continued

| TRANSMITTED LEVEL (IRE UNITS) | LEVEL CODING | |
|---|---|---|
| 20 | 0 | 1 |
| 0 | 0 | 0 |

The D/A converter 122 converts the digital PAM data signals on lines 95 to provide pulse-amplitude-modulated scrambled audio signals on line 145.

In the preferred embodiment, the scrambled audio signal is communicated as a component in a scrambled television signal during the interval normally occupied by the horizontal sync pulse in a video signal line. The insertion of the scrambled audio signal in the scrambled television signal is described in the aforementioned U.S. Pat. No. 4,563,702.

Figure 5:
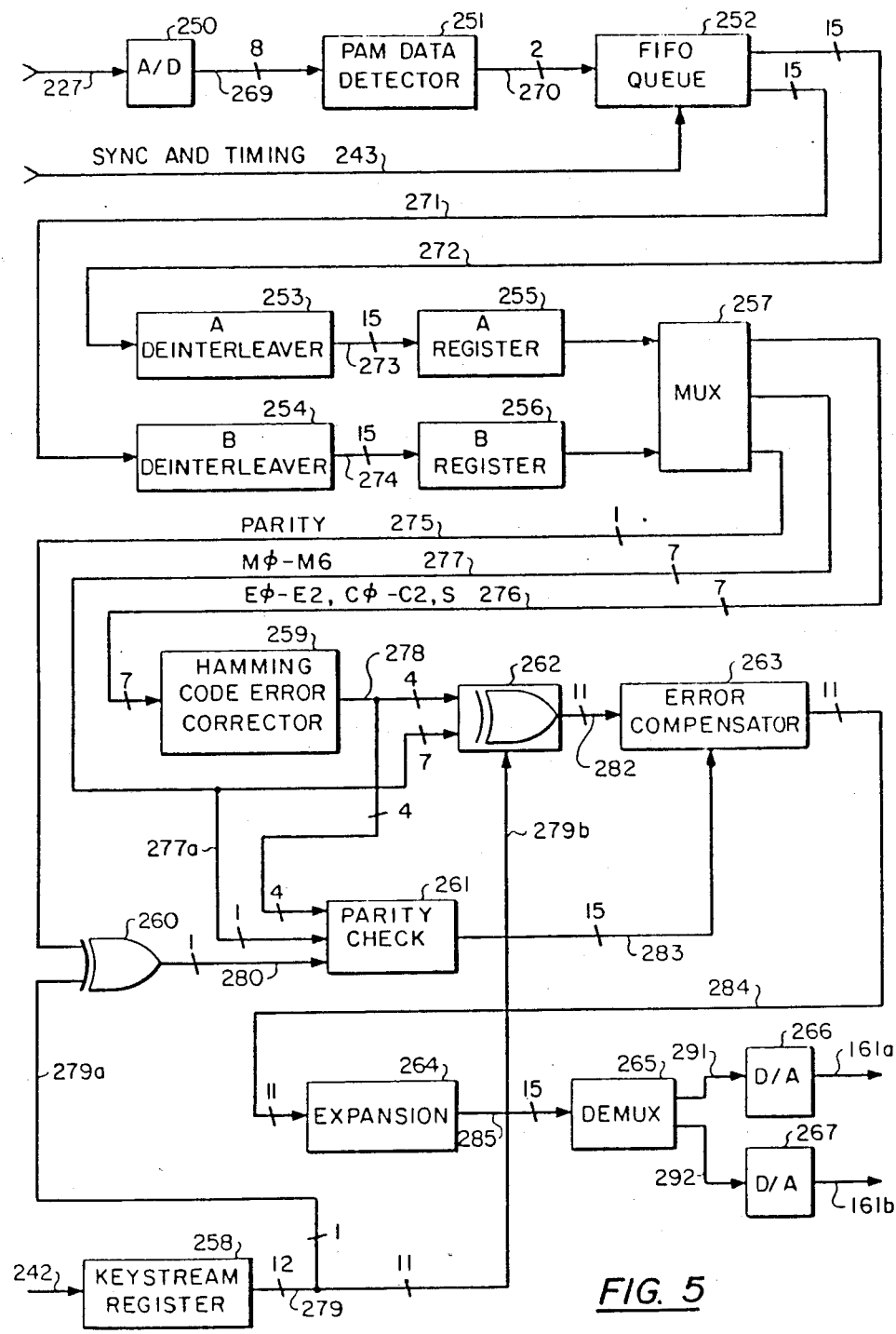
FIG. 5 is a block diagram of the preferred embodiment of the audio descrambling system of the present invention.

The preferred embodiment of the audio signal descrambling system is shown in FIG. 5. It descrambles scrambled audio signals scrambled by the scrambling system of FIG. 1.

The descrambling system includes an A/D converter 250, a PAM data detector 251, a FIFO queue 252, an A-channel deinterleaver 253, a B-channel deinterleaver 254, an A-channel register 255, a B-channel register 256, a multiplexer 257, a keystream register 258, a Hamming code error corrector 259, a first exclusive-OR logic element 260, a parity check logic element 261, a second exclusive-OR logic element 262, an error compensator 263, an expansion system 264, a demultiplexer 265, a first D/A converter 266, and a second D/A converter 267.

The A/D converter 250 converts a scrambled analog audio signal received on line 227 into an 8-bit digital PAM data signal which is provided on lines 269 to the PAM data detector 251. The PAM data detector 251 converts the PAM data signals on lines 269 into two-bit digital words in accordance with the level code set forth in Table 4 and provides the two-bit digital words on lines 270 to the FIFO queue.

The FIFO queue 252 time-expands the time-compressed intervals of the digital word signals on lines 270 so that the digital words occurring on line 270 during an interval corresponding to the duration of a horizontal sync pulse are provided at regular intervals over an interval corresponding to the duration of an NTSC video signal line. The operation of the FIFO queue 252 in expanding the time-compressed digital word signals on lines 270 is synchronized and clocked in response to clocking signals and synchronization control signals provided on lines 243. The synchronization control signals on lines 243 are derived in response to detection of the color burst signal in the original video signal. Such derivation is described in the aforementioned U.S. Pat. No. 4,563,702.

The FIFO queue 252 converts the serial digital words on lines 270 into parallel 15 bit signals and demultiplexes the these 15-bit signals into the interleaved signal samples derived from the A-channel and B-channel interleavers 113 and 114, respectively, in the scrambling system of FIG. 1. The 15-bit A-channel signal is provided on lines 271 to the A-channel deinterleaver 253; and the 15-bit B-channel signal is provided on lines 272 to the B-channel deinterleaver 254.

Figure 6A:
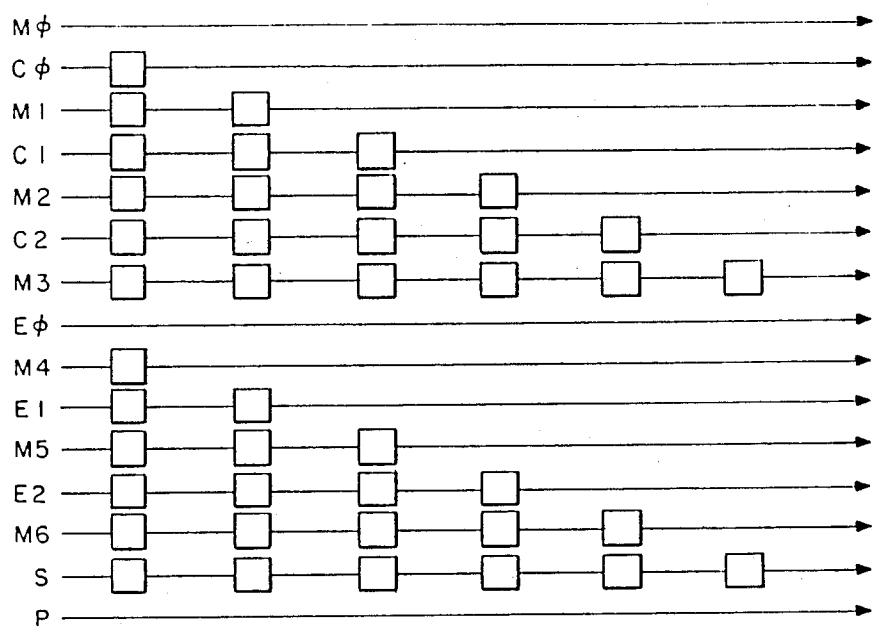
FIG. 6a is a block diagram of the A-channel deinterleaver in the system of FIG. 5.

The A-channel deinterleaver 253 deinterleaves the interleaved signal sample on lines 271 to provide a signal sample on lines 273 where all of the bits are from a single signal sample provided on A-channel lines 137 to the A-channel interleaver 113 in the audio scrambling system of FIG. 1. The construction of the A-channel deinterleaver 253 is shown in FIG. 6A, wherein each block is a one-sample-period delay element. It is seen from FIG. 6A that bits C0, M3 and P are not delayed; bits M0 and E1 are delayed by one sample period; bits C1 and M4 are delayed by two sample periods; bits M1 and E2 are delayed by three sample periods; bits C2 and M5 are delayed by four sample periods; bits M2 and S are delayed by five sample periods; and bits E0 and M6 are delayed by six sample periods.

Figure 6B:
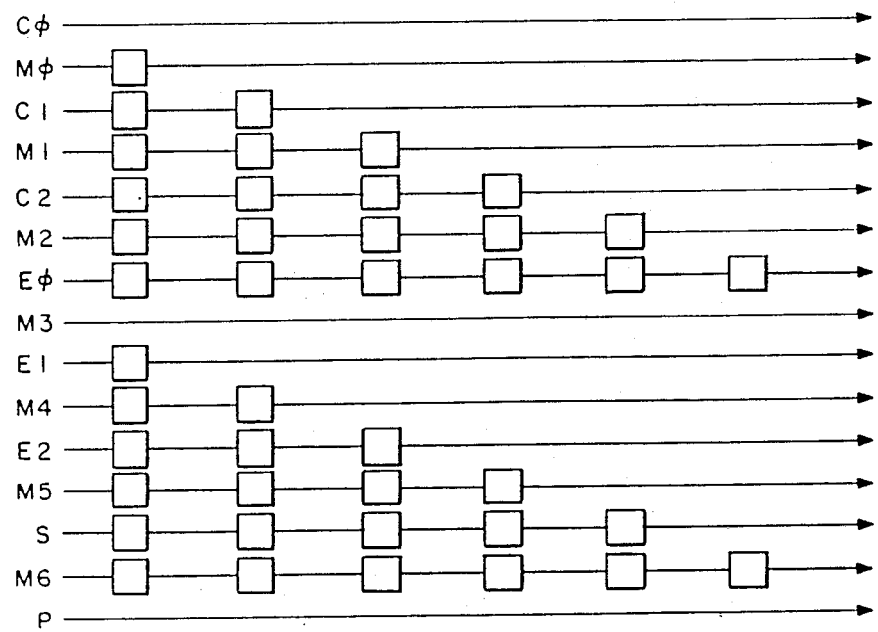
FIG. 6b is a block diagram of the B-channel deinterleaver in the system of FIG. 5.

The B-channel deinterleaver 254 deinterleaves the interleaved signal sample on lines 272 to provide a signal sample on lines 274 wherein all of the bits are from a single sample provided on B-channel lines 138 to the B-channel interleaver in the audio scrambling system of FIG. 1. The construction of the B-channel deinterleaver 254 is shown in FIG. 6B, wherein each block is a one-sample-period delay element. It is seen from FIG. 6B that bits M0, E0 and P are not delayed; bits C0 and M4 are delayed by one sample period; bits M1 and E1 are delayed by two sample periods; bits C1 and M5 are delayed by three sample periods; bits M2 and E2 are delayed by four sample periods; bits C2 and M6 are delayed by five sample periods; and bits M3 and S are delayed by six sample periods.

It is seen from FIGS. 4 and 6 that the combined delay time for each of the bits in each of the channels is six sample periods.

Table 5 shows the relationship between the serialized digital word signals on lines 270 and the delay provided by the deinterleavers 253 and 254 to provide the bits for the A and B channel signal samples on lines 273 and 274, respectively.

TABLE 5

| TIME | DELAY | I | Q |
|---|---|---|---|
| 1 | 0 | C0-A | M0-B |
| 1 | 1 | C0-B | M0-A |
| 2 | 2 | C1-A | M1-B |
| 3 | 3 | C1-B | M1-A |
| 4 | 4 | C2-A | M2-B |
| 5 | 5 | C2-B | M2-A |
| 6 | 6 | E0-A | M3-B |
| 7 | 0 | E0-B | M3-A |
| 8 | 1 | E1-A | M4-B |
| 9 | 2 | E1-B | M4-A |
| 10 | 3 | E2-A | M5-B |
| 11 | 4 | E2-B | M5-A |
| 12 | 5 | S-A | M6-B |
| 13 | 6 | S-B | M6-A |
| 14 | 0 | P-A | P-B |

The deinterleaved signal samples on lines 273 and 274 are provided to the A-channel register 255 and the B-channel register 256 and multiplexed by the multiplexer 257 to provide the parity bit P on line 275; the exponent bits E0, E1 and E2, the code bits C0, C1 and C2 and the sign bit S on lines 276; and the seven mantissa bits M0 through M6 on lines 277.

The Hamming code error corrector 259 examines the three code bits on lines 276 to detect singular errors in the combination of the exponent bits, code bits and sign bit and corrects any such singular errors. The three exponent bits and the sign bit corrected as necessary are provided by the Hamming code error corrector on lines 278. The error detection code employed by the Hamming code error corrector is shown in Table 6.

TABLE 6

| C2 | C1 | C0 | BIT IN ERROR |
|----|----|----|--------------|
| 0 | 0 | 0 | NO ERROR |
| 0 | 0 | 1 | C0 |
| 0 | 1 | 0 | C1 |
| 0 | 1 | 1 | S |
| 1 | 0 | 0 | C2 |
| 1 | 0 | 1 | E2 |
| 1 | 1 | 0 | E1 |
| 1 | 1 | 1 | E0 |

The exclusive-OR logic element 260 exclusive-OR's the parity bit P on line 275 with one bit of a unique keystream on line 279a from the keystream register 258 that is identical to the bit provided on line 136 to scramble the parity bit P on line 135a in the scrambling system of FIG. 1. The exclusive-OR logic element 260 thereby provides a descrambled parity bit on line 280, which is processed by the parity check logic element 261 with the most significant mantissa bit M6 on line 277a and the error-corrected sign and exponent bits on lines 278 to detect double errors in the combination of the sign and exponent bits and the code bits on lines 276 and to further detect an error in the most significant mantissa bit and/or the parity bit. Such errors are detected when the parity check does not result in unity. The parity check is accomplished by exclusive-OR'ing the bits provided to the parity check logic element 261 on lines 277a, 278, and 280.

The exclusive-OR logic element 262 descrambles the seven mantissa bits on lines 277 and the sign bit and three exponent bits on lines 278 by exclusive-OR'ing these eleven bits with eleven bits of a unique keystream on line 279b from the keystream register 258 that are identical to the keystream bits provided on lines 132 to scramble the sign bit, three exponent bits and seven mantissa bits on lines 126 in the scrambling system of FIG. 1.

The keystream bits provided by the keystream register on lines 279 are provided to the keystream register via lines 242 from a keystream generator (not shown). The system for providing a unique keystream to the keystream register 258 via lines 242 in the descrambling system of FIG. 5 that is identical to the unique keystream provided on lines 102 the keystream register 133 in the scrambling system of FIG. 1 is described in the aforementioned U.S. Patent Application by Gilhousen and Newby, Jr., the entire disclosure of which is incorporated herein by reference.

The exclusive-OR logic element 262 provides the descrambled bits as a descrambled signal sample on lines 282 to the error compensator 263.

When errors are detected by the parity check logic element 261, an error signal is provided on line 283 to the error compensator 263. If an error signal is not provided on line 283, the error compensator 263, passes the eleven-bit descrambled signal sample from lines 282 to the expansion system 264 via lines 284. When an error signal is provided on line 283 the error compensator 263 compensates for the detected errors by repeating on lines 284 the last previous error free signal sample received on lines 282.

The expansion system 264 expands the 11-bit signal samples on lines 284 into a 15-bit digital signal sample on lines 285 that can be converted into an analog audio signal by digital-to-analog conversion.

Figure 7:
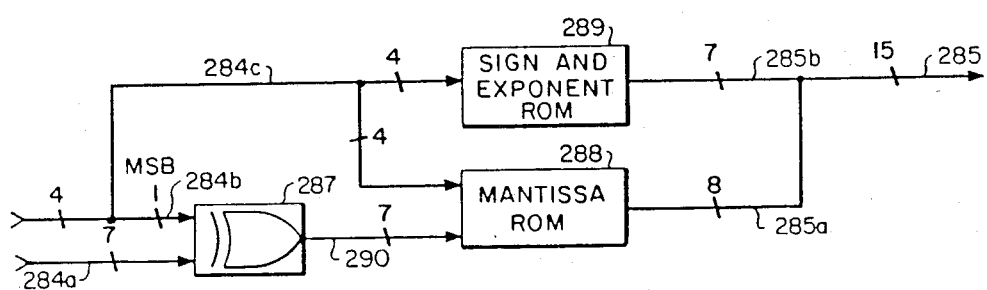
FIG. 7 is a block diagram of the signal-expansion portion of the expansion system in the system of FIG. 5.

Referring to FIG. 7, the expansion system includes an exclusive-OR element 287, a mantissa ROM 288 and a sign and exponent ROM 289. The exclusive-OR logic element 287 descrambles the seven mantissa bits M0 through M6 on lines 284a by exclusive-OR'ing the seven mantissa bits with the most significant exponent bit E2 on line 284b. The descrambled mantissa bits are provided by the exclusive-OR element 287 on lines 290 and are combined with the three exponent bits E0, E1 and E2 and the sign bit S on lines 284c to address the mantissa ROM 288, which in turn provides the eight least significant bits of the expanded digital signal sample on lines 285a. The sign bit S and three exponent bits E0, E1 and E2 on lines 285c also are used to address the sign and exponent ROM 289, which in turn provides the seven most significant bits of the expanded digital signal sample on lines 285b. The 11 to 15 expansion code implemented by the combination of the mantissa ROM 288 and the sign and exponent ROM 289 is set forth in Table 7.

TABLE 7
11 to 15 EXPANSION

| INPUT BINARY | | | OUTPUT BINARY | | | | | | | | | | | | | |
|---|---|---|---|---|---|---|---|---|---|---|---|---|---|---|---|---|
| SIGN | EXPONENTS | MANTISSA | | | | | | | | | | | | | | |
| 1 | 111 | A B C D E F G | 1 | 1 | A | B | C | D | E | F | G | X | X | X | X | X |
| 1 | 110 | A B C D E F G | 1 | 0 | 1 | A | B | C | D | E | F | G | X | X | X | X |
| 1 | 101 | A B C D E F G | 1 | 0 | 0 | 1 | A | B | C | D | E | F | G | X | X | X |
| 1 | 100 | A B C D E F G | 1 | 0 | 0 | 0 | 1 | A | B | C | D | E | F | G | X | X |
| 1 | 011 | A B C D E F G | 1 | 0 | 0 | 0 | 0 | 1 | A | B | C | D | E | F | G | X |
| 1 | 010 | A B C D E F G | 1 | 0 | 0 | 0 | 0 | 0 | 1 | A | B | C | D | E | F | G |
| 1 | 110 | A B C D E F G | 1 | 0 | 0 | 0 | 0 | 0 | 1 | A | B | C | D | E | F | G |
| 1 | 000 | A B C D E F G | 1 | 0 | 0 | 0 | 0 | 0 | 0 | 0 | A | B | C | D | E | F | G |
| 0 | 000 | A B C D E F G | 0 | 1 | 1 | 1 | 1 | 1 | 1 | 1 | A | B | C | D | E | F | G |
| 0 | 001 | A B C D E F G | 0 | 1 | 1 | 1 | 1 | 1 | 1 | 0 | A | B | C | D | E | F | G |
| 0 | 010 | A B C D E F G | 0 | 1 | 1 | 1 | 1 | 1 | 0 | A | B | C | D | E | F | G | X |
| 0 | 011 | A B C D E F G | 0 | 1 | 1 | 1 | 1 | 0 | A | B | C | D | E | F | G | X | X |
| 0 | 100 | A B C D E F G | 0 | 1 | 1 | 1 | 0 | A | B | C | D | E | F | G | X | X | X |
| 0 | 101 | A B C D E F G | 0 | 1 | 1 | 0 | A | B | C | D | E | F | G | X | X | X | X |
| 0 | 110 | A B C D E F G | 0 | 1 | 0 | A | B | C | D | E | F | G | X | X | X | X | X |
| 0 | 111 | A B C D E F G | 0 | 0 | A | B | C | D | E | F | G | X | X | X | X | X | X |

The demultiplexer 265 separates the A-channel and B-channel digital sample signals provided sequentially on lines 285 and provides the separated signal samples on lines 291 and 292 respectively to the first and second D/A converters 266 and 267.

The first D/A converter 266 converts the A-channel digital signal samples on lines 291 to an analog audio signal on A-channel line 161a; and the second D/A converter 267 converts the B-channel digital signal samples on lines 292 to an analog audio signal on B-channel line 161b.

We claim:

1. A system for scrambling an audio signal for transmission with a video signal having non-video information intervals comprising
   - means for converting an analog audio signal into a scrambled compressed digital audio signal;
   - means for combining individual bits from the scrambled compressed digital audio signal to provide n-bit digital words where n is at least equal to two;
   - means for converting each digital word into a >n-bit digital PAM data signal having a binary value bearing a predetermined relationship to the binary value of the converted n-bit digital word:
   - means for converting the >n-bit digital PAM data signal into an $2^n$-level PAM analog signal; and
   - means for inserting the PAM analog signals into the non-video information intervals of the video signal for transmission.

2. A system according to claim 1, wherein n equals two, and the digital PAM data signal consists of eight bits.

3. A system for descrambling a scrambled audio signal derived by converting an analog audio signal into a digital signal to provide a scrambled compressed digital audio signal, by combining individual bits from the scrambled compressed digital audio signal to provide n-bit digital words where n is at least equal to two by converting each digital word into a >n-bit digital PAM data signal having a binary value bearing a predetermined relationship to the binary value of the converted n-bit digital word, and by converting the >n-bit digital PAM data signal into a $2^n$-level PAM analog signal, wherein the PAM analog signals were inserted into non-video information intervals of a video signal for transmission, the system comprising
   - means for converting the $2^n$-level PAM analog signals into >n-bit digital PAM data signals;
   - means for converting each >n-bit digital PAM data signal into an n-bit digital word having a value bearing a predetermined relationship to the binary value of the >n-bit digital PAM data signal;
   - means for providing a scrambled digital audio signal from the n-bit digital words; and
   - means for converting the scrambled digital audio signal into a descrambled decompressed analog audio signal.

4. A system according to claim 3, wherein n equals two, and the digital PAM data signal consists of eight bits.

* * * * *